(12) United States Patent
Schukovets et al.

(10) Patent No.: US 10,362,140 B2
(45) Date of Patent: Jul. 23, 2019

(54) INTERACTION PATTERN FOR A MOBILE TELECOMMUNICATION DEVICE

(71) Applicant: SAP SE, Walldorf (DE)

(72) Inventors: Igor Schukovets, Walldorf (DE); Gregor Tielsch, Walldorf (DE); Erich Schulzke, Walldorf (DE)

(73) Assignee: SAP SE, Walldorf (DE)

(*) Notice: Subject to any disclaimer, the term of this patent is extended or adjusted under 35 U.S.C. 154(b) by 294 days.

(21) Appl. No.: 15/363,525

(22) Filed: Nov. 29, 2016

(65) Prior Publication Data
US 2017/0155736 A1 Jun. 1, 2017

(30) Foreign Application Priority Data
Nov. 30, 2015 (EP) .................................. 15197016

(51) Int. Cl.
G06F 15/16 (2006.01)
H04L 29/08 (2006.01)
H04L 29/06 (2006.01)
G06F 9/54 (2006.01)
G06F 9/451 (2018.01)

(52) U.S. Cl.
CPC .............. H04L 67/32 (2013.01); G06F 9/452 (2018.02); G06F 9/54 (2013.01); H04L 67/02 (2013.01); H04L 67/04 (2013.01); H04L 67/42 (2013.01)

(58) Field of Classification Search
CPC ......... H04L 67/32; H04L 67/02; H04L 67/04; H04L 67/42; G06F 9/452; G06F 9/54
USPC ........................................................ 709/203
See application file for complete search history.

(56) References Cited

U.S. PATENT DOCUMENTS

| 8,726,230 | B1 | 5/2014 | Wen et al. | |
| 8,751,568 | B1 | 6/2014 | Mears | |
| 2008/0189360 | A1 | 8/2008 | Kiley et al. | |
| 2012/0054263 | A1* | 3/2012 | Demant | G06F 9/52 709/203 |
| 2016/0048418 | A1* | 2/2016 | Le | G06F 11/079 714/37 |

OTHER PUBLICATIONS

Extended European Search Report for European Patent Application 15197016.7 dated May 13, 2016.

* cited by examiner

Primary Examiner — Wing F Chan
Assistant Examiner — Joseph R Maniwang
(74) Attorney, Agent, or Firm — Harness, Dickey & Pierce, P.L.C.

(57) ABSTRACT

The present disclosure relates to a telecommunication method for operating a mobile telecommunication device being connectable to a backend server configured for executing a data processing logic via a wireless digital telecommunication network, the mobile telecommunication device and the backend server communicating with each other using a unidirectional request-response-protocol. The disclosure further relates to a mobile telecommunication device and a telecommunication system configured for performing the respective method.

19 Claims, 10 Drawing Sheets
INTERACTION PATTERN FOR A MOBILE TELECOMMUNICATION DEVICE

CROSS-REFERENCE TO RELATED APPLICATIONS

This application claims priority under 35 USC § 119 to European Patent Application No. 15197016.7, filed on Nov. 30, 2016 in the European Intellectual Property Office (EPO), the contents of which are herein incorporated by reference in their entirety.

FIELD OF THE INVENTION

The present invention relates to a telecommunication method for operating a mobile telecommunication device. The present invention further relates to a mobile telecommunication device and a telecommunication system for performing the respective method.

BACKGROUND

Regarding the continuous growth of data amounts provided for transmission in modern information systems, telecommunication systems transmitting and processing data are faced with high performance requirements to be met.

To process data complex and extensive calculations using algorithms which require considerable processor power may be necessary. In order to provide sufficient processor power on the one hand and to ensure mobility on the other hand, modern telecommunication systems may separate the input and representation of data from the computationally intensive processing of data. A mobile telecommunication device, like e.g. a smartphone, may be used for inputting and displaying data, while calculations necessary for processing the inputted data and generating data to be displayed are performed on a backend server.

This distribution of tasks between e.g. a smartphone and a backend server communicating with each other via a wireless digital telecommunication network, like e.g. a cellular network, requires an efficient exchange of data between the smartphone and the backend server. In order to ensure a consistent communication between the smartphone and the backend server, a message exchange pattern based on a unidirectional request-response-protocol may be used. The smartphone requests processed data from the backend server, the backend server responses by transmitting data according to the request. However, since the data processing is performed by the backend server, the smartphone has no insight into this data processing. Thus, when requesting processed data by the smartphone, there is a risk of missing relevant results of the data processing by requesting less processing results than necessary. In order to avoid this risk, the smartphone may request all possible results, e.g. the entire data structure provided by the backend server. This may lead to a transmission of large amounts of data resulting in a considerable latency of communication as well as high power consumption by the smartphone.

Thus, in order to meet high performance requirements, an efficient method for operating a mobile telecommunication device is required. In particular, a method is required for operating the mobile telecommunication enabling an efficient communication with a backend server using a unidirectional request-response-protocol.

SUMMARY

The present invention as described by the subject matter of the independent claims provides a telecommunication method for efficiently operating a mobile telecommunication device as well as a mobile telecommunication device and a telecommunication system for performing the respective method. Various advantageous embodiments are described in the independent claims.

In one aspect, the invention relates to telecommunication method for operating a mobile telecommunication device being coupleable to a wireless digital telecommunication network. The mobile telecommunication device comprises a first processor, a display device, an input device, and a first memory. The first memory comprises a first application and a first data structure, wherein the first data structure comprises first data fields. The first application comprises first instructions that, when executed on the first processor, cause the display device to display a graphical user interface configured for displaying selectable first data fields, for displaying data input inputted into the selected data fields and for displaying data content stored in first data fields. Each first data field is assigned to a second data field of a second data structure comprised by a backend server.

The mobile telecommunication device is connectable to the respective backend server via the wireless digital telecommunication network. The mobile telecommunication device and the backend server communicate with each other using a unidirectional request-response-protocol.

The backend server comprises a second processor and a second memory. The second memory comprises a second application and the respective second data structure. The second application comprises second instructions that, when executed on the second processor, cause the backend server to execute a data processing logic on the second data structure upon receiving data input from the mobile telecommunication device. The data processing logic establishes a correlation between the data contents of two or more of the second data fields.

The method performed by the mobile telecommunication device comprises:
  receiving from the input device a data input for a first data field selected via the graphical user interface, the selected first data field being assigned with first metadata indicating a dependency between the selected first data field and one or more dependent first data fields of the first data fields, the respective dependency of the dependent first data fields resulting from the correlation established by the data processing logic of the backend server between the data content of a selected second data field of the second data fields which is assigned to the selected first data field and the data content of one or more dependent second data fields of the second data fields, wherein each dependent second data field is assigned to one of the one or more dependent first data fields,
  in response to receiving the data input, storing and displaying the received data input of the selected first data field,
  sending to the backend server a first request requesting to store the received data input in the respective selected second data field,
  determining the one or more dependent first data fields indicated by the first metadata,
  sending to the backend server a second request requesting to return after execution of the data processing logic the data contents of the one or more dependent second data fields assigned to the determined one or more dependent first data fields,
  in response to sending the second request, receiving the requested data contents, in response to receiving the requested data contents, storing and displaying the received data contents.

This method may allow for an efficient data exchange between the mobile telecommunication device and the backend server via the wireless telecommunication network using a unidirectional request-response-protocol. The mobile telecommunication device is used for inputting and displaying data. The mobile telecommunication device displays a graphical user interface with a plurality of first data fields of the first data structure. One or more of the displayed data fields may be selectable for inputting data, i.e. data values, into the same. One or more of the displayed data fields may not be selectable for inputting data, but may only display data content, i.e. data values, stored in the first data structure. The mobile telecommunication device enables a user to select one of the selectable first data fields and to input data into the selected data field.

The backend server comprises a second data structure corresponding to the first data structure in that each of the first data fields is assigned to one of the second data fields. According to embodiments each of the second data fields is assigned to one of the first data fields. According to embodiments the number of data fields of the first data structure may equal the number of data fields of the second data structure. The data input received by the mobile telecommunication device is sent to the backend server by a first request. The backend server stores the received data input in a second data field which is assigned to the selected first data field to which the data input has been inputted, i.e. the selected second data field. Furthermore, the backend server processes the received data input by executing a data processing logic on the second data structure comprising the data input provided by the mobile telecommunication device. Depending on the data input provided as well as on the processing logic applied, new data contents for one or more of the second data fields to which a first data field is assigned may be generated and stored therein and/or the data contents of one or more of the second data fields to which a first data field is assigned may be updated by the backend server. According to embodiments, even the data input received from the mobile telecommunication device may be amended by the processing logic. In some cases, neither new contents nor updates resulting in an amendment of any data contents may be generated.

One or more of the selectable first data fields may be provided with first metadata indicating a dependency between the selected first data field and one or more dependent first data fields, i.e. data fields of the first data structure identified by the first metadata. The first metadata may e.g. be implemented in form of an extension of field control properties, like e.g. mandatory, visible, read-only, etc.

The respective dependency results from a correlation established by the data processing logic of the backend server between the data content of a selected second data field of the second data fields which is assigned to the selected first data field and the data content of one or more dependent second data fields of the second data fields. The data input of the selected first data field is provided to the backend server by the first request and stored in the selected second data field as its data content. This data content of the selected second data field provided by the mobile telecommunication device is processed by the processing logic of the backend server. The application of the processing logic on the respective data content results in new data content for one or more of the second data fields and/or updated data contents of one or more of the second data fields, i.e. the respective one or more dependent second data fields. The first metadata indicates the first data fields to which the one or more second data fields are assigned, i.e. the second data fields which contents may be amended due to applying the processing logic on the data stored in the selected second data field.

In order to display each first data field with an up-to-date data content, i.e. the data content of the second data field assigned to the respective first data field which results from applying the processing logic, the mobile telecommunication device has to request up-to-date data contents from the backend server. By determining one or more dependent first data fields indicated by the first metadata and requesting to return after execution of the data processing logic the data contents of the one or more dependent second data fields assigned to the determined one or more dependent first data fields, the amount of data transferred from the backend server in response is reduced to only those data contents which may have possibly been amendment and/or generated by the data processing logic. Thereby, the amount of data request from the backend server which has not been generated and/or amended by applying the data processing logic may be minimized and/or even avoided entirely. Thus the efficiency of the data communication may be increased by decreasing the amount of data transferred.

A smaller amount of data to be transferred via the wireless mobile telecommunication device reduces the latency of the communication and reduces the power consumption of the mobile telecommunication device receiving the respective amount of data. The energy consumption of the mobile telecommunication device may be reduced by receiving less data to be stored and displayed, thus e.g. requiring updating only a portion the graphical user interface. This reduction of energy consumption may be particularly advantageous for a battery-powered mobile telecommunication device by extending the battery runtime.

Embodiments may thus allow for an efficient communication between the mobile telecommunication device and the backend sever using a unidirectional interaction pattern, e.g. according to the HTTP client-server paradigm, wherein requests are sent by the mobile telecommunication device, i.e, client, while responses are sent by the backend server.

Embodiments further may allow reducing maintenance costs by executing the data processing logic on the backend server. The risk of getting into maintenance issues due to a distribution of the data processing logic on two different systems, like e.g. the mobile telecommunication device and the backend server, may be avoided. As a consequence, the graphical user interface has to send requests, e.g. HTTP/HTTPS requests, to the backend server for providing new data input to the backend server. New data input may lead to changes of additional data fields, when being processed by the data processing logic. In order to be able to display updates for data changes resulting from the data processing logic, the mobile telecommunication device has to explicitly request each of the respective updates from the backend server.

In case of dealing with hierarchically structured data sets and/or data fields, changes on one set and/or field may trigger a complex processing logic resulting in further changes of additional data sets and/or data fields, e.g. on different hierarchical levels.

Changing some data of a, e.g. hierarchically structured, first data structure on the graphical user interface of a mobile telecommunication device may require processing the changed data by the data processing logic on the backend server. This may result in changes, also referred to as side effects, to the set of data fields comprising the changed data and/or to depending data fields of second sets of data fields. These changes resulting from applying the processing logic need to be returned to the graphical user interface in order to display a valid, consistent, and/or enriched first data structure.

The updates of the data contents stored in the second data structure of the backend server may be performed with a first request, e.g. an HTTP 'PUT' request. The server may response to this request with '200 ok' and/or an updated data input resulting from processing by the data processing logic the data input provided by the mobile telecommunication device. According to embodiments, the response may even be empty. In case a data input and/or data content of a set of data fields is sent to the backend server using a 'PUT' request, the data content of the entire set of data fields resulting from applying the data processing logic may be returned. For sending multiple HTTP 'PUT' requests requesting to store multiple data inputs e.g. the OData protocol may be used allowing for bundling these multiple 'PUT's in a common request message in form of a single HTTP POST '$batch' request. In order to ensure that the data contents of all dependent second data fields are returned to the graphical user interface, i.e. all side effects of the data processing logic are taken into account, a 'GET' for each of the dependent second data fields and/or sets of data fields determined using the first metadata may be required. With the OData protocol this may for example be realized with an appropriate '$expand' clause of the HTTP 'GET' request. The respective HTTP 'GET' itself may be added to the above-mentioned '$batch' request.

A telecommunication device as used herein is a mobile device that is able to wireless transmit telephonic, electronic, digital, cellular, or radio communications to a network, which transfers the respective communications to another device. A mobile telecommunication device may for example without limitation be a mobile phone, in particular a smartphone, a tablet computer, a personal digital assistant (PDA), an eBook reader, a laptop, a smartwatch, a head device like smartglasses, or the like. The mobile telecommunication device may be battery-powered.

A digital network may be any kind of digital information network. A network may be such that it can be implemented to work in a telecommunication system, i.e, as a telecommunication network for communication, i.e. information exchange, between two entities of the system. The telecommunication network may be compliant with any one of the following: TCP/IP, Ethernet, ATM, CDMA, GSM, HSCSD, GPRS, WCDMA, EDGE, Bluetooth, UMTS, HSPA+, Teldesic, Iridium, Inmarsat, WLAN, LTE, LTE-Advanced, WiMAX, WiMAX-Advanced, and i-mode.

Thereby, a telecommunication network as used herein is a collection of terminals, links, and processes which connect together so that communication can be made. In other words, it is a data communication network such as, for example, the Internet or an intranet. The digital telecommunication network may be a wireless network, i.e. the mobile telecommunication device connects the respective telecommunication network wireless. The respective telecommunication network may e.g. be a mobile telecommunication network also known as a cellular telecommunication network distributed over land areas called cells, each served by at least one fixed-location transceiver, known as a cell site or base station. A mobile wireless cellular digital telecommunication network is a telecommunication network that provides services by using a large number of base stations, each covering only a limited area. It may allow a number of mobile telecommunication devices to communicate with each other and with other devices of a telecommunication system anywhere in the network. For example, the cellular network may use the global system for mobile communication (GSM), code division multiple access (CDMA) or other technologies.

For communication between two entities of the telecommunication network a communication link between the respective entities may be implemented as a point-to-point data communication channel over a data network between two computer application programs of the respective entities, such as the mobile telecommunication device and the backend server or the telecommunication control server and the second telecommunication devices. In an exemplary embodiment the communication link may be established for example using TCP/IP communication protocol and sockets. When the communication has been established, application programs may communicate with each other using for example remote procedure calls. Sending and receiving data by the respective members of the network may for example be performed using a network identification address. The network identification address may comprise for example an HTTP URL address. A communication link may be a secure data link, e.g. comprising a secure hypertext transfer protocol (HTTPS) connection. This may provide a secure way for transmitting data.

It is understood that ordinal numbers, like e.g. 'first' and 'second', are used herein to indicate different element assigned with the same name, but not necessarily to establish any order of the respective elements. In particular, the numbering of requests is only used to distinguish between the different types of requests. It does not indicate or imply any order in which the requests are sent, but is merely based on the order of appearance of the different types of requests in the claims.

According to embodiments an authentication of the mobile telecommunication device may be performed by the backend server before accepting data from and/or providing data to the mobile telecommunication device. The authentication may for example be performed by checking if an ID of the mobile telecommunication device is locally stored at the backend server as a trusted ID, i.e, the backend server may only respond to requests submitted by mobile telecommunication devices having a trusted ID.

A data structure as used herein may be any data structure comprising a plurality of data fields, each data field configured to comprise a data content also referred to as a data value. The data structure may be systematically organized, e.g. in a hierarchical form. Data fields of the data structure may form sets, each set comprising a plurality of data fields. The respective sets of data fields may be ordered hierarchically. One or more of the data fields may be assigned with metadata.

An application program, also known as application, refers to a computer program designed to perform a group of coordinated functions, tasks, or activities on a computer device.

A graphical user interface or user interface as used herein refers to an interface generated by a program for displaying information on a display device with selectable user interface elements. User interface elements as used herein may be understood as a user interface object, or a set of user interface objects, displayed on a display screen of a device. A user interface element may e.g. comprise a button, a text box, a tab, an icon, a text field, a pane, a check-box item, a menu bar, a title bar, an action bar or item group or the like. A user interface element may likewise be an image, a display of an alphanumeric character and a combination thereof. A user interface element may comprise one or more data fields of a data structure. The respective one or more data fields may be selectable for inputting data into the same and/or may be configured for displaying data values stored in the same.

A display or display device as used herein for displaying a graphical user interface encompasses an output device or a user interface adapted for displaying images or data. A display may output visual and/or tactile data, Examples of a display include, but are not limited to: a computer monitor, a touch screen, a tactile electronic display, a braille screen, a bistable display, an electronic paper, a vector display, a flat panel display, a vacuum fluorescent display (VF), a light-emitting diode (LED) displays, an electroluminescent display (ELD), a plasma display panels (PDP), a liquid crystal display (LCD), an organic light-emitting diode displays (OLED), a projector, or a head-mounted display.

The Open Data Protocol (OData) is an open protocol allowing the creation and consumption of queryable and interoperable RESTful APIs, i.e, it is an application-level protocol for interacting with data via RESTful web services. The OData protocol supports the description of data models and the editing and querying of data according to those models providing a uniform way to describe both the data and the data model. Thus semantic interoperability between systems is improved and an ecosystem enabled.

The OData protocol may comprise a metadata document describing the types, sets, functions and actions understood by an OData service. Clients may use the metadata document to understand how to query and interact with other entities in the OData service Representational State Transfer (REST) refers to a software architecture for building scalable web services, REST gives a coordinated set of constraints to the design of components in a distributed hypermedia system that may have the beneficial effect of enabling a higher-performing and more maintainable architecture.

A system conforming to the constraints of REST may be called RESTful, A RESTful system may e.g. communicate over HTTP with the same HTTP verbs, like GET, POST, PUT, DELETE, etc., which web browsers use to retrieve web pages and to send data to remote servers. REST interfaces with external systems using resources identified by URI may be operated upon using standard verbs.

An API (Application Programming Interface) refers to a set of routines, protocols, and tools for building software applications. An API may express software components in terms of their operations, inputs, outputs, and underlying types. In view of REST services, an API may refer to a specification of remote calls exposed to an API user.

A stateless protocol is a communications protocol that treats each request as an independent transaction that is unrelated to any previous request so that the communication consists of independent pairs of request and response. A stateless protocol does not require the server to retain session information or status about each communication partner for the duration of multiple requests. In contrast, a protocol which requires keeping of the internal state on the server is known as a stateful protocol, Examples for stateless protocols are HTTP and HTTPS. The resulting client-server communication is constrained by no client context being stored on the server between requests. Each request from any client contains all the information necessary to service the request, and session state is held in the client. The session state can be transferred by the server to another service such as a database to maintain a persistent state for a period and allow authentication. The client begins sending requests when it is ready to make the transition to a new state. The stateless design simplifies the server design because there is no need to dynamically allocate storage to deal with conversations in progress.

According to embodiments, the first data structure comprises a plurality of sets of first data fields, each of the respective sets comprises one or more of the first data fields,
   the selected first data field being comprised by a first one of the respective sets, the one or more dependent first data fields being comprised by one or more dependent second ones of the respective sets,
   the second request sent by the mobile telecommunication device further requesting in addition to the data content of the selected first data field to return after execution of the data processing logic the data contents of the second data fields assigned to the additional first data fields comprised by the respective first set.

This may have the beneficial effect that the first data structure may comprise a plurality of sets of data fields. Each set may comprise a plurality of first data fields which are intended to receive data inputs and/or store data contents which are correlated to each other. The respective correlation may be established by the data processing logic which is applied by the backend server to the second data fields assigned to the first data fields of the respective set. The intra-set correlations, i.e. the correlations between the data fields of the same set, may be taken into account by requesting to return after execution of the data processing logic the data contents of the second data fields assigned to the additional first data fields comprised by the respective first set. The sets of first data fields may form pre-defined combinations of data fields for which processed data is requested in combination, if a data input is received for a selected data field comprised by the respective set. This may have the beneficial effect of reducing the amount and/or complexity of first metadata assigned to the first data structure.

According to embodiments, the first metadata indicates the dependency between the selected first data field and the one or more dependent first data fields by indicating a dependency between the respective selected first data field and one or more dependent second sets comprising the respective dependent first data fields,
   the second request sent by the mobile telecommunication device further requesting to return the data contents of the one or more dependent second data fields by requesting to return after execution of the data processing logic the data contents of each second data field assigned to one of the first data fields of the one or more dependent second sets of first data fields.

This may have the beneficial effect that the first metadata implement inter-set correlations, i.e. dependencies between data fields of different data sets. This may be particularly beneficial in case the first data structure is a hierarchical data structure comprising a plurality of sets of first data fields assigned to different levels of the hierarchy.

According to embodiments, the second request sent by the mobile telecommunication device further requests to return after execution of the data processing logic the data content stored in the selected second data field.

This may have the beneficial effect that the data content, which results from the execution of the data processing logic and which is stored in the selected second data field, is used for updating the data input stored in the first selected data field and displayed on the graphical user interface. Thereby, even amendments applied by the processing logic to the data input itself, which is received from the mobile telecommunication device, are taken into account and displayed on the mobile telecommunication device.

According to embodiments, the method further comprises:

receiving from the input device a set of data inputs for a selected third set of first data fields selected via the graphical user interface, each of the selected first data fields being assigned with first metadata indicating a dependency between the respective selected first data field and one or more dependent first data fields, the respective dependency resulting from the correlation established by the data processing logic of the backend server between the data content of a selected second data field of the second data fields which is assigned to the respective selected first data field and the data content of one or more dependent second data fields of the second data fields, wherein each of the respective dependent second data field is assigned to one of the one or more of the respective dependent first data fields, in response to receiving each data input, storing and displaying the received data input of the respective selected first data field, the first request sent by the mobile telecommunication device further requesting to store each of the received data inputs in a selected second data field of the second data fields which is assigned to the selected first data field of the respective data input, determining for each of the selected first data fields the one or more dependent first data fields indicated by the first metadata of the respective selected first data field, the second request sent by the mobile telecommunication device further requesting to return after execution of the data processing logic the data contents of each of the dependent second data fields assigned to one of the determined one or more dependent first data fields, in response to sending the second request, receiving the requested data contents, in response to receiving the requested data contents, storing and displaying the received data contents.

This may have the beneficial effect that not only one data input is taken into account, but a plurality of data inputs is taken into account. The storing requests for the respective plurality of data inputs may be bundled into one first request in form of a request message comprising a plurality of individual requests. The backend server may process the individual storing requests according to the order of the individual respective requests comprised by the first request. Requesting by a single request message the data contents of all the dependent second data fields for a plurality of selected second data fields and receiving the requested data contents comprised by a single response message may reduce the total overhead of the messages necessary for transmitting the data.

According to embodiments, the sending of the first and second request further comprises combining the first and the second request into one common request message and sending the respective common request message to the backend server.

This may have the beneficial effect that the total overhead of the messages necessary for transmitting the requests may be reduced. Thereby, the latency of the communication is reduced.

According to embodiments, the receiving of the requested data contents further comprises receiving a common response message comprising a storing confirmation in reply to the first request and the requested data contents in reply to the second request.

This may have the beneficial effect that the total overhead of the messages necessary for transmitting the responses to the first and second data request may be reduced. Thereby, the latency of the communication is reduced.

According to embodiments, the first data structure is hierarchically structured.

This may have the beneficial effect that the processability of the respective data is improved and the amount of data stored reduced. According to embodiments, the second data structure may be hierarchically structured as well.

According to embodiments, the method further comprises in order to assign the one or more of the first data fields with the first metadata:

performing an automatic analysis on the hierarchical structure of the first data structure by the mobile telecommunication device resulting in the first metadata for the one or more first data fields, assigning the resulting first metadata to the one or more first data fields.

This may have the beneficial effect that first metadata may automatically and efficiently be assigned to first data fields of the first data structure by the mobile telecommunication device. The hierarchical structure of the data may be implemented by assigning each of the first data fields to one or more data fields of a higher level of hierarchy and/or to one or more data fields of a lower level of hierarchy. For example, the mobile telecommunication device may determine for one or more of the selectable first data fields which first data fields of one or more higher and/or one or more lower levels of hierarchy are directly or indirectly assigned to the respective first data field. A data field may be assigned indirectly to another data field, when both data fields are directly assigned to the same third data field. According to embodiments the analysis may be performed for each selectable first data field.

According to embodiments, the method further comprises in order to assign the one or more of the first data fields with the first metadata:

sending to the backend server a third request requesting first metadata to be assigned to one or more of the first data fields, in response to sending the third request, receiving the first metadata for the one or more first data fields, the received first metadata resulting from an automatic analysis by the backend server on the correlation established by the processing logic between the data contents of two or more of the second data fields, in response to receiving the first metadata, assigning the one or more first data fields with the received first metadata.

This may have the beneficial effect that by providing the first metadata by the backend sever the respective first metadata may automatically and efficiently be assignable to first data fields of the first data structure. For example, the backend server may analyze the data processing logic and determine for one or more of the second data fields for the calculation of which other second data field(s) they are used. The respective other second data fields determined by this analysis are identified as dependent second data fields depending on the respective one or more second data fields for which the analysis is performed. The one or more first data fields assigned to the respective one or more second data fields for which the analysis is performed are assigned with the first metadata. The first metadata identifies for each of the respective one or more first data fields the dependent first data fields which are assigned to one of the one or more dependent second data fields determined by the analysis.

According to embodiments the analysis may be performed for each second data field assigned to a selectable first data field. According to embodiments the third request may be sent before the first and second request in order to assign the one or more of the first data fields with the first metadata. Thus, the first metadata may be used before the first and second request are sent.

According to embodiments, one more of the first data fields are assigned with second metadata indicating a level of importance of the respective first data field, the method further comprises:
 sending the first request in responds to determining that the levels of importance of the one or more selected first data fields satisfy a pre-defined criterion.

This may have the beneficial effect that data inputs are provided to the backend server by dynamically taking into account their level of importance which is provided by the second metadata assigned to the first data fields to which the respective data inputs are inputted. Only in case it is determined that the levels of importance of the one or more selected first data fields satisfy a pre-defined criterion, the first request requesting to store the data inputs of the one or more selected first data fields is sent to the backend server. This may have the beneficial effect that due to bundling the numbers of requests and responses transmitted between the mobile telecommunication device and the backend server are reduced. Thereby, the total data overhead of messages required to send requests and responses is reduced as well as the latency of the communication. The second metadata may e.g. be implemented in form of an extension of field control properties, like e.g. mandatory, visible, read-only, etc According to embodiments, wherein the second metadata comprise numerical values, the method further comprises:
 summing up the second metadata of the one or more selected first data fields, the pre-defined criterion being satisfied by the sum of second metadata exceeding a pre-defined threshold,
 upon sending the first request, resetting the sum of the second metadata to zero.

This may have the beneficial effect that an efficient pre-defined criterion is provided. Further, in case data inputs with a high level of importance are received, the data inputs are provided to the backend server with less delay than in case of data inputs with a lower level of importance. On the other hand, in case of a plurality of data inputs with a low level of importance, the respective inputs may be collected and sent to backend server using a common request message rather than sending one after another a plurality of individual request messages comprising a single request each.

Thus, a new metadata property 'importance level' indicating the importance of a single data field with respect to the execution of data processing logic on the backend server, e.g. in form of an integer value, is introduced by the second metadata.

These values may be summed, if the corresponding data fields to which they are assigned receive a data input. Once the sum exceeds a pre-defined threshold, the backend data processing logic is called, i.e. first and second requests are sent to the backend server, while resetting the sum to 0.

According to embodiments, a binary approach may be used allowing only values of 0 and values larger than the pre-defined threshold for the second metadata. Inputting data to a data field assigned with a second metadata of 0 may never trigger a first request, while inputting data to a data field assigned with a second metadata lager than the pre-defined threshold may always trigger a request. According to embodiments, such a triggered first request may only request to store the data input which has triggered the request. According to embodiments, such a triggered first request may request to store all the data input which has been received since the last time a first request has been triggered, i.e. all data input taken into account by the sum exceeding the pre-defined threshold.

According to embodiments, the second metadata assigned to at least one first data field is larger than the pre-defined threshold.

This may have the beneficial effect that important data inputs, i.e. inputs which are inputted to a first data field which is assigned with a second metadata larger than the pre-defined threshold, are sent to the backend server without further delay by waiting for additional data inputs. This further allows receiving quickly the results from applying the data processing logic to the respective data input by the backend server.

According to embodiments, second metadata is assigned to each selectable first data fields.

This may have the beneficial effect that for each data input to each selectable first data field a level of importance may be defined and assigned.

According to embodiments, the method further comprises in order to assign the one or more of the first data fields with the second metadata:
 performing an automatic analysis on the hierarchical structure of the first data structure by the mobile telecommunication device resulting in the second metadata for the one or more first data fields,
 assigning the resulting second metadata to the one or more first data fields.

This may have the beneficial effect that second metadata may automatically and efficiently be assigned to first data fields of the first data structure by the mobile telecommunication device. For example, the level of importance assigned to a first data field may depend on the number and/or level of importance of those first data fields of one or more lower levels of hierarchy which are assigned directly and/or indirectly to the respective first data field due to the hierarchical structure.

According to embodiments, the method further comprises in order to assign the one or more of the first data fields with the second metadata:
 sending to the backend server a fourth request requesting second metadata to be assigned to one or more of the first data fields,
 in response to sending the fourth request, receiving the second metadata for the one or more first data fields, the received second metadata resulting from an automatic analysis by the backend server on the correlation established by the processing logic between the data contents of two or more of the second data fields,
 in response to receiving the second metadata, assigning the one or more first data fields with the received second metadata.

This may have the beneficial effect that by providing the second metadata by the backend sever the respective first metadata may automatically and efficiently be assignable to first data fields of the first data structure. For example, the level of importance assigned to a first data field may depend on the number and/or level of importance of those first data fields correlated to the respective first data field due to the data processing logic of the backend server.

In another aspect, the invention relates to a mobile telecommunication device, wherein the mobile telecommunication device is configured for performing any of the telecommunication methods described above.

In another aspect, the invention relates to a telecommunication system comprising a mobile telecommunication device and a backend server, wherein the mobile telecommunication device and the backend server are configured for performing any of the telecommunication methods described above.

The backend server may be specially configured for the required purposes, or it may comprise a general term computer device configured for telecommunication which is selectively activated or reconfigured for the required purposes by a computer program stored in the computer device. Such a computer program may be stored in a computer readable storage medium, such as, but is not limited to, any type of disk including floppy disks, optical disks, CD-ROMs, and magnetic-optical disks, read-only memories (ROMs), random access memories (RAMS) such as dynamic RAM (DRAM), EPROMs, EEPROMs, magnetic or optical cards, or any type of media suitable for storing electronic instructions, and each coupled to a computer system bus.

According to embodiments, the telecommunication system further comprises an intermediate server, the intermediate server being connected to the mobile telecommunication device via the wireless digital telecommunication network, the backend server being connected to the wireless digital telecommunication network and the mobile telecommunication device via the intermediate server,
the intermediate server comprising a third processor and a third memory with a third application, the third application comprising third instructions that, when executed on the third processor, cause the intermediate server to:
receive a plurality of requests combined in a common request message, extract the respective requests and transfer the extracted requests to the backend server,
in responds to transferring the extracted requests to the backend server, receive a plurality of responses, combine the received responses into a common response message, and send the respective response message to the mobile telecommunication device via the wireless digital telecommunication network.

This may have the beneficial effect that the intermediate server, which may e.g. be provided by a webserver, may efficiently receive and process common request messages by extract individual requests comprised by the common request messages and transfer the extracted requests to the backend server. Further, a plurality of responses to the extracted plurality of requests may be efficiently combined into a common response message which is sent to the mobile telecommunication device via the wireless digital telecommunication network. Thereby, the exchange of a plurality of requests and a plurality of responses may be combined into the exchange of one common request massage and one common response message managed by the intermediate server on the remote side, i.e, the backend side of the telecommunication system.

The intermediate server may be connectable to the backend server by a second network. The second network may be a wired or wireless network. According to embodiments the intermediate server is part of the same computer system as the backend server. According to embodiments the intermediate server is implemented by software only running on the same computer system and/or computer device as the backend server. Further, the respective software in form of the third application comprising third instructions may be stored on the second memory of the backend server and executed by the second processor of the backend server.

A webserver as used herein may refer to a server processing requests via HTTP or HTTPS and providing responses to the respective requests. The term may refer to a hardware computer system, a computer appliance, i.e. a separate and discrete hardware device with integrated software and/or firmware, specifically designed to provide a specific computing resource like accepting and supervising HTTP/HTTPS requests, or a software that accepts and supervises the HTTP/HTTPS requests. A server may refer to a computer system, computer appliance or software that waits for requests from other computer systems, computer appliances or software, i.e. clients, and responds to them.

The intermediate server may be specially configured for the required purposes, or it may comprise a general term computer device configured for telecommunication which is selectively activated or reconfigured for the required purposes by a computer program stored in the computer device. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

Embodiments may comprise a computer program product comprising a computer readable storage medium having machine executable instructions embodied therewith, the machine executable instructions being executable by a processor of a mobile telecommunication device, execution of the machine readable instructions on the processor causing the processor to control the mobile telecommunication device to perform any of the telecommunication methods described above.

It is understood that one or more of the aforementioned embodiments of the invention may be combined as long as the combined embodiments are not mutually exclusive.

BRIEF DESCRIPTION OF THE DRAWINGS

In the following, embodiments of the invention are explained in greater detail, by way of example only, making reference to the drawings in which.

DETAILED DESCRIPTION

Figure 1:
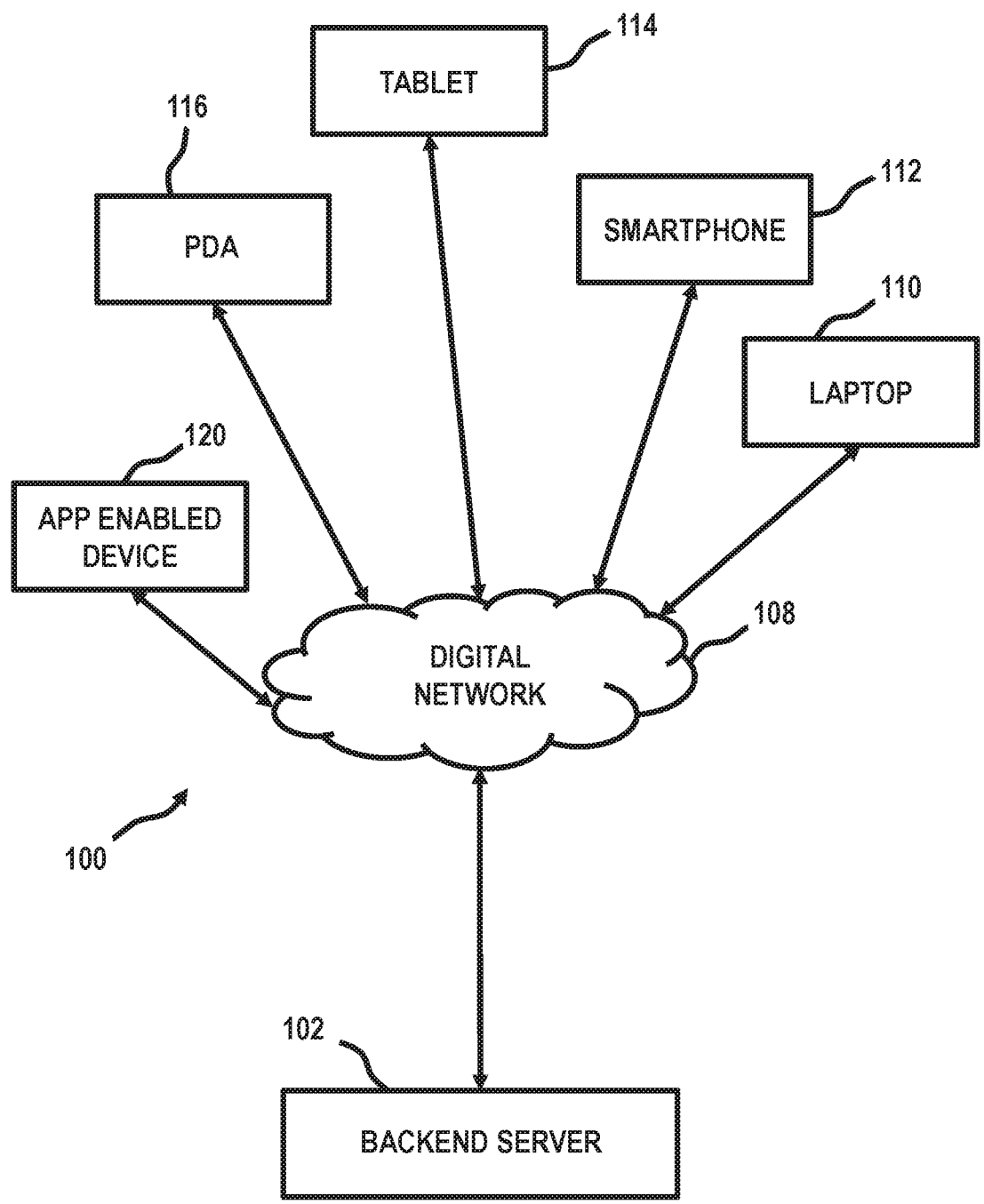
FIG. 1 depicts a first schematic diagram illustrating an exemplary telecommunication system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Various embodiments herein include one or more of systems, method, software, and data structures that are utilized in presenting data within graphical user interfaces of mobile telecommunication devices. Some embodiments may be considered as spanning two layers of a technical data processing infrastructure: 1) a backend data server e.g. of an enterprise for data processing, such as an enterprise resource planning (ERP) system, customer relationship management (CRM) system, and the like; according to examples, this layer may also comprise an intermediate server that operates between the backend server and mobile telecommunication devices of users to proxy data processing requests from the mobile telecommunication devices to the backend server; and 2) telecommunication devices that present data to users and receive input with regard to data and data processing activities. According to embodiments the intermediate server may further be configured to transform data of the backend server into presentation-friendly forms for the mobile telecommunication device.

The mobile telecommunication devices as described and illustrated herein include tablet computing devices, smartphones, computing devices, and the like. However, telecommunication devices may also include devices with applications that execute within web browsers, mobile display devices, or smart controllers within automobiles, and other devices that are executing respective applications.

FIG. 1 shows a first schematic diagram illustrating an exemplary telecommunication system 100. The system 100 is an example computing environment within which various embodiments may be implemented. The system 100 includes a backend server 102 e.g. of an enterprise, such as one or more of an enterprise resource planning (ERP) system, customer relationship management (CRM) system, human resources management (HRM) system, a transaction processing system, an order processing system, a banking system, and the like. The backend server 102 may further be connected to a database (not shown) comprising a plurality of data structures stored therein. The backend server 102 and the database may both be parts of a common unit or parts of separate units.

The backend server 102 may be accessed by one or more mobile telecommunication devices 110, 112, 114, 116, 120 via the wireless telecommunication network 108, which e.g. may be a cellular telecommunication network. The mobile telecommunication devices 110, 112, 114, 116, 120 may be configured as thick-clients or thin-clients. According examples, the backend server 102 may communicate with the telecommunication devices 110, 112, 114, 116, 120 either directly or via an intermediate server (not shown) via a communication link of the wireless telecommunication network 108.

The digital network 108 is a wireless digital telecommunication network capable of transmitting data between computing devices of the various functional data processing elements of the system 100, such as the backend server 102 and various mobile telecommunication devices 110, 112, 114, 116, 120. The wireless telecommunication network 108 may be one or more of virtually any type of network capable of transmitting data as described, such as one or more of a local area network, a wide area network, a system area network, a value added network, a virtual private network, a cellular network, the Internet, and other such networks.

Figure 2:
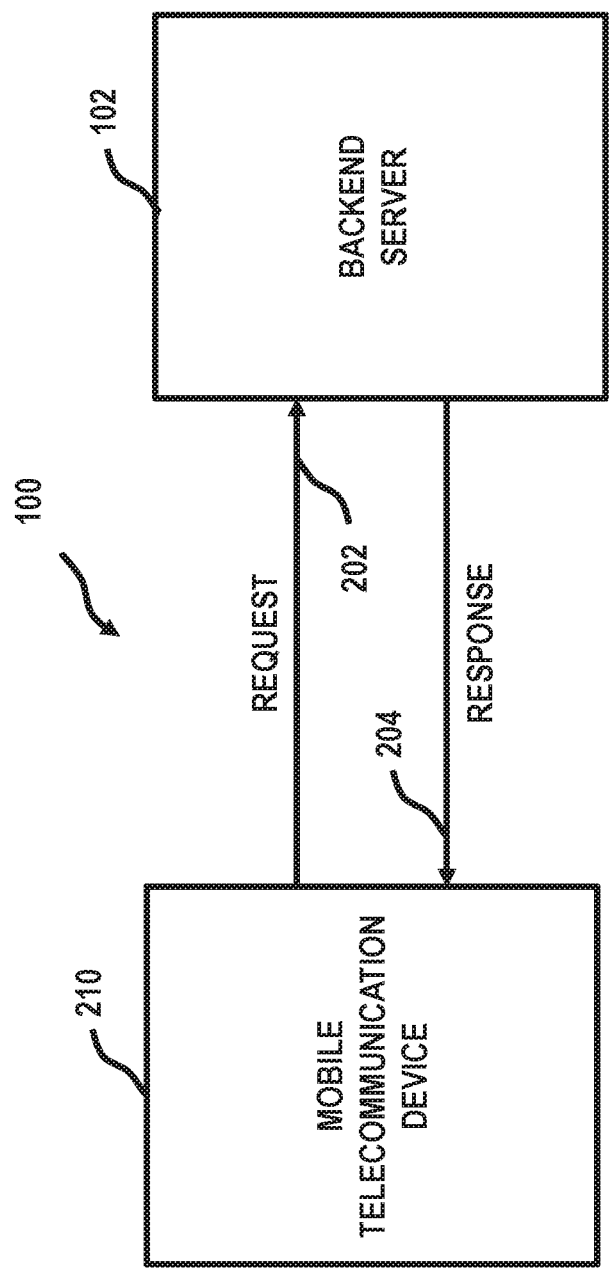
FIG. 2 depicts a second schematic diagram illustrating an exemplary telecommunication system.

FIG. 2 shows a second schematic diagram illustrating an exemplary telecommunication system 100. The telecommunication system 100 comprises a mobile telecommunication device 210, e.g. any of the various mobile telecommunication devices 110, 112, 114, 116, 120 of FIG. 1, connected to backend server 102 via a digital telecommunication network. The telecommunication device 210 and the backend server 102 communicate with each other using a unidirectional request-response-protocol like HTTP or HTTPS. The telecommunication device 210 sends requests 202 to the backend server 102 and receives responses 204 from the backend server 102. However, due to the unidirectional nature of the communication protocol, telecommunication device 210 only receives messages responding to direct requests previously sent to the backend server 102. The backend server 102 neither autonomously initiates a communication nor does it autonomously sent messages to the backend server 102. A stateless protocol may be used for the respective communication.

Figure 3:
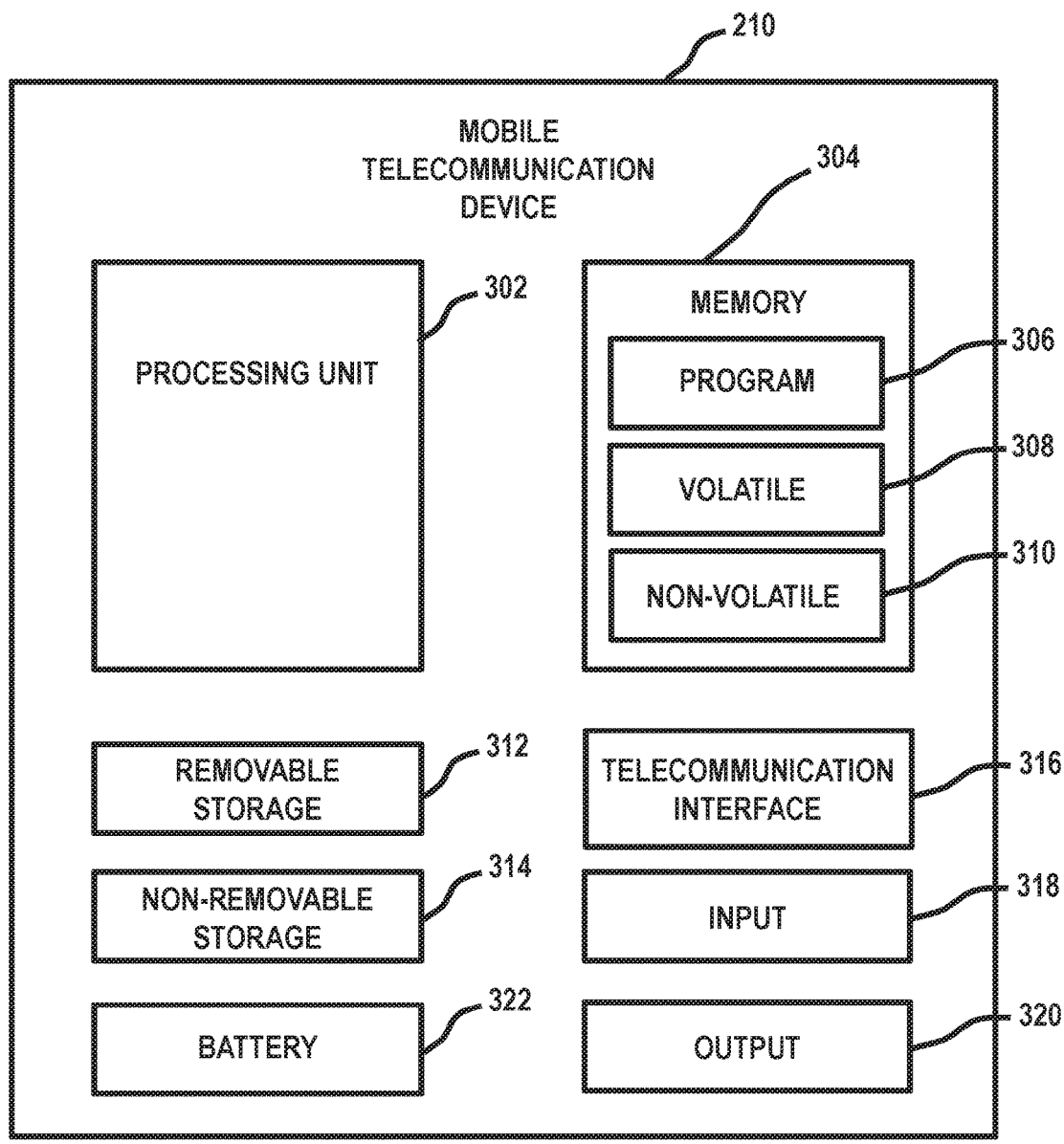
FIG. 3 depicts a schematic diagram illustrating an exemplary handheld battery-powered mobile end user telecommunication device.

FIG. 3 shows a schematic diagram illustrating an exemplary mobile telecommunication device 210. The telecommunication device 300 may comprise a processing unit 302, also referred to as a processor. It may further comprise e.g. a memory 304 including volatile memory 308 and/or non-volatile memory 310, removable storage 312, and/or non-removable storage 314. The telecommunication device 210 may be configured as a handheld battery-powered mobile end user telecommunication device like e.g. be a smartphone, a tablet, a PDA, a smartwatch or the like. Although the various exemplary data storage elements are illustrated as part of the mobile telecommunication device 210, the storage elements may also or alternatively include cloud-based storage accessible via a network, such as the Internet.

The mobile telecommunication device 210 may include or have access to a computer environment that includes a variety of computer-readable media, such as e.g. volatile memory 308 and non-volatile memory 310, removable storage 312 and non-removable storage 314. Computer storage comprised by or accessible to the mobile telecommunication device 210 may include random access memory (RAM), read-only memory (ROM), erasable programmable read-only memory (EPROM), electrically erasable programmable read only memory (EEPROM), flash memory or other memory technologies. The mobile telecommunication device 210 may have access e.g. via a network to compact disc read only memory (CDROM), digital versatile discs (DVD) or other optical disc storage, magnetic cassettes, magnetic tape, magnetic disc storage or other magnetic storage devices, or any other medium capable for storing computer-readable instructions. The mobile telecommunication device 210 may comprise or have access to a computer environment that includes an input device 318, an output device 320, and a telecommunication interface 316, like e.g. a transceiver, for communicating via a wireless digital telecommunication network, e.g. a mobile cellular telecommunication network. The telecommunication interface 316 may further be configured to communicate via other types of wireless digital telecommunication networks like Wi-Fi, Bluetooth and the like. The input device 318 may include one or more of a touchscreen, touchpad, keypad, camera, microphone and other input devices. The mobile telecommunication device 210 may operate in a networked environment using the telecommunication interface 316 to connect to one or more remote computer systems like a backend server. Further exemplary remote computer systems may include personal computers, networked PCs, a router, a peer device or other common network nodes, or the like. The communication interface 316 may be a network interface device such as an Ethernet card and/or a wireless card or circuit that may be connectable to a network. The network may for example include one or more of a local area network (LAN), a wide area network (WAN), the Internet and other networks. The network may for example include one of the following digital cellular technologies, including: Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), or Integrated Digital Enhanced Network (iDEN).

The output device 320 may comprise a display device for displaying a graphical user interface, a loudspeaker, and the like. The output device 320 and the input device 318 may be implemented by a common device configured for inputting data as well as displaying data like e.g. touchscreen. Computer-readable instructions stored on a computer-readable medium are executable by the processing unit 302 of the mobile telecommunication device 210. For example, various computer programs or applications, such as one or more applications and modules implementing one or more of the methods illustrated and described herein or an application that is executed on the mobile telecommunication device 210 or is accessible via a web browser, may be stored on a non-transitory computer-readable medium.

Figure 4:
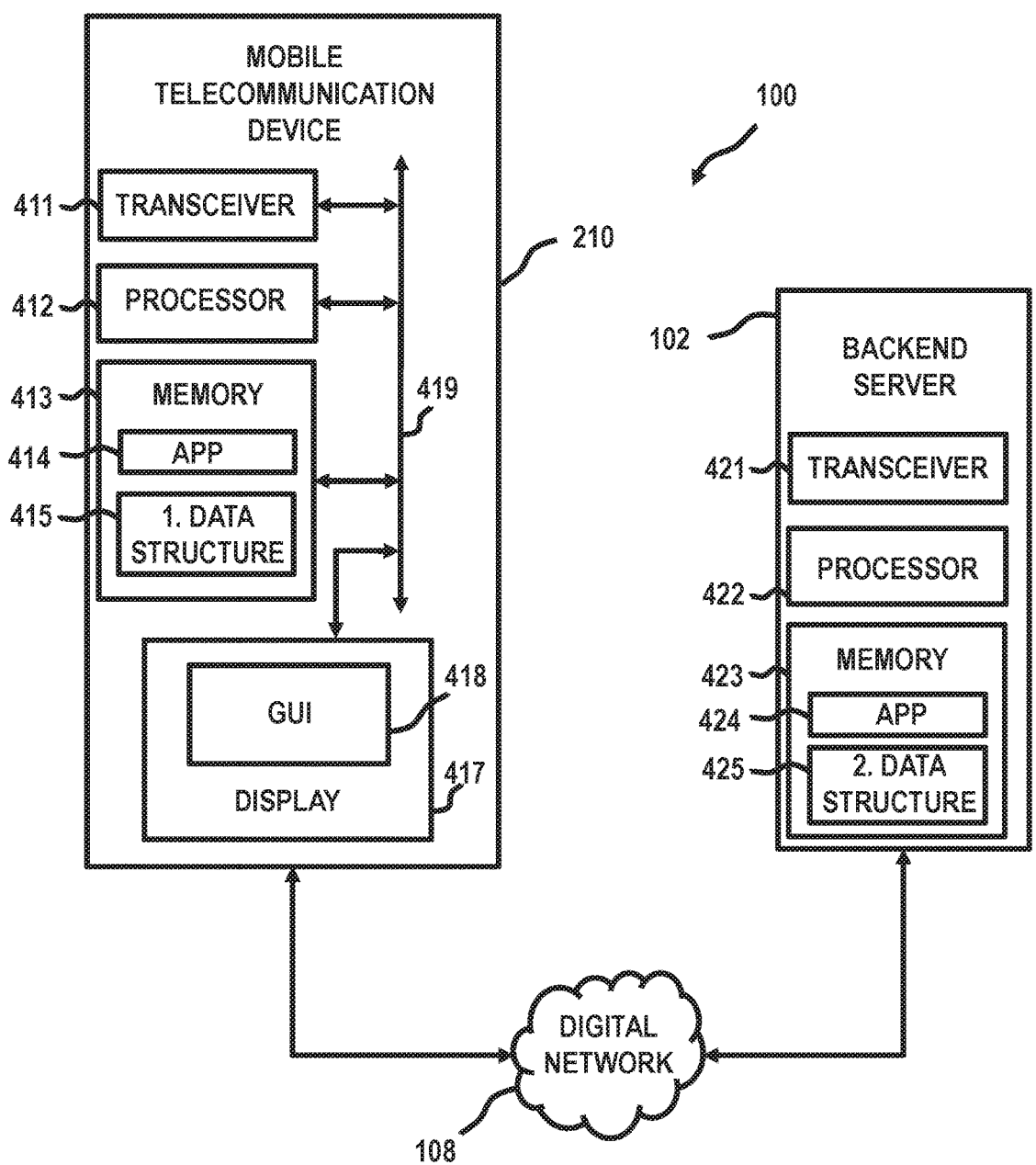
FIG. 4 depicts a third schematic diagram illustrating an exemplary telecommunication system.

FIG. 4 shows a schematic diagram illustrating an exemplary telecommunication system 100, comprising an exemplary mobile telecommunication device 210 and backend server 102. The mobile telecommunication device 210 may communicate with the backend server 102 via a digital telecommunication network 108. The mobile telecommunication device 210 may comprise a transceiver 411, a processor 412, a memory 413, e.g. a main memory, each capable of communicating with one or more components of mobile telecommunication device 210. For example, all components are coupled to a bidirectional system bus 419.

The processor 412 may be a microprocessor, a semi-processor, a multi-core processor or the like. The processor 412 may control the operation of the mobile telecommunication device 210. The transceiver 411 may be implemented as a transmitting component of the mobile telecommunication device 210. The mobile telecommunication device 210 may further comprise a display device 417 which displays characters, images and the like. The display device 417 may be configured to display a graphical user interface (GUI) 418. The display device 417 may be a touchscreen. The memory 413 may comprise an application 414 which is configured to generate a graphical user interface 418 to be displayed by the display device 417 and to control the communicate with the backend server 102. The memory 413 may further comprise a first data structure 415 comprising a plurality of first data fields. The first data structure 415 may be a hierarchical structure which is displayed by the graphical user interface 418. The first data fields may be displayed by the graphical user interface 418, wherein one or more of the displayed fields are selectable for inputting a data input. Upon receiving a data input, the data input may be stored in the memory 413 as part of the first data structure 415 and displayed by the graphical user interface 418. Furthermore, according to some embodiments, the graphical user interface 418 may display the data content of one or more first data fields which are not selectable and to which no data input may be provided by the mobile telecommunication device 210. These first data fields may e.g. comprise data which is provided by the backend server 102 resulting from an execution of an application 424 comprising a data processing logic for processing a second data structure 425 or pre-defined data.

The mobile telecommunication device 210 may be connected via the wireless digital telecommunication network 108 to the backend server 102. The backend server 102 may be implemented in form of a computer system comprising one or more computer devices or by a single computer device. The telecommunication device 210 may use the transceiver 411 for exchanging data with the backend server 102 via the network 108, e.g. according to a unidirectional request-response-protocol. The backend server 102 may comprise a transceiver 421 for communication with the telecommunication device 210, a processor 422 for controlling the backend server 102, a memory 423 comprising an application 424 in form of computer-executable program instructions as well as a second data structure 425. The computer instructions 424, when being executed by the processor 422, may control the backend server 102 to communicate with the mobile telecommunication device 210 and to apply a data processing logic to the second data structure 425.

Figure 5:
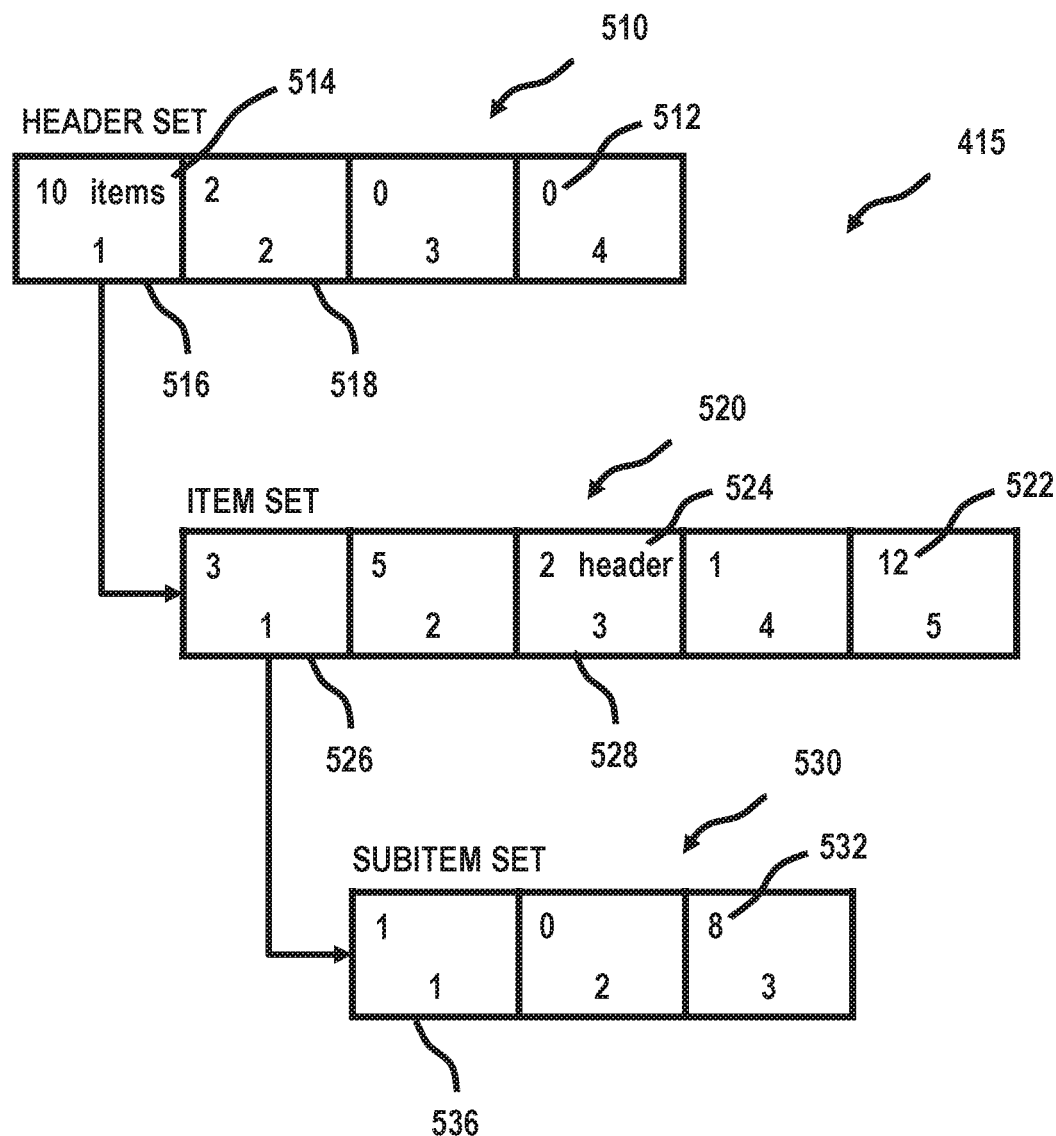
FIG. 5 depicts a schematic diagram illustrating an exemplary data structure.

FIG. 5 shows a schematic diagram illustrating an exemplary first data structure 415. The first data structure 415 is a hierarchical data structure comprising e.g. three levels of hierarchy. There is a set of data fields on each level, i.e. a header set 510 on a $1^{st}$ level, an item set 520 on a $2^{nd}$ level and a subitem set 530 on a $3^{rd}$ level. The header set 510 of the exemplary data structure shown in FIG. 5 comprises four data fields like data field 516, i.e. header data fields 1 to 4, the item set 520 comprises five data fields like data field 526, i.e. item data fields 1 to 5, and the subitem set 530 comprises 3 data fields like data field 536, i.e. subitem data fields 1 to 3. The first header data field 516 is for example assigned with first metadata 514 'items' indicating that the item set 510, i.e. item data fields 1 to 5 are depending on the first header data field 516. The third item data field 528 is for example assigned with first metadata 524 'header' indicating that the header set, i.e. header data fields 1 to 4 are depending on the third item data field 524.

When the first header field 516 is selected and a data input is received for selected data field 516, the mobile telecommunication device may store the received data input in the selected field, i.e, first header field 516, and display the data input. The mobile telecommunication device may further determine using the first metadata 514 that the item set 510, i.e. item data fields 1 to 5 are depending on the selected data field. The mobile telecommunication device may send to the backend server a first request requesting to store the received data input in the second data field assigned to the first header field 516. Furthermore, the mobile telecommunication device may send a second request requesting to return after execution of the data processing logic the data contents the second data fields assigned to the depending item data fields 1 to 5. In response to receiving the requested data contents of the respective second data fields, the received data contents are stored in item data fields 1 to 5 displayed by the graphical user interface. According to examples, the second request may further request to return after execution of the data processing logic the data contents of the additional data fields of the header set 510, i.e. header data field 2 to 4. According to examples the second request may further request to return after execution of the data processing logic the data content stored in the second data field assigned to the selected first header field 516. The respective data content stored in the second data field assigned to the selected first header field 516 may be the result of applying the data processing logic to the data input received from the first data structure 415.

When the third item field 528 is selected and a data input is received for the selected data field 528, the mobile telecommunication device may store the data input in the third item field 528 and determine the header set 510 to be depending on the respective selected third item field 528. Therefore, the second data request may request to return after execution of the data processing logic the data contents of the header set, i.e. header data fields 1 to 4. In response to receiving the requested data contents of the respective second data fields, the received data contents are stored in header data fields 1 to 4 and displayed by the graphical user interface. According to examples, the second request may further request to return after execution of the data processing logic the data contents of the additional field of the item set 520, i.e. item data fields 1, 2, 4 and 5. According to examples the second request may further request to return after execution of the data processing logic the data content stored in the second data field assigned to the selected third item field 528. The respective data content stored in the second data field assigned to the selected third item field 528 may be the result of applying the data processing logic to the data input received from the first data structure 415.

When one of the data fields of the subitem set 530, like e.g. the first data field 536 is selected and provided with data input, the second request may further request to return after execution of the data processing logic the data content stored in the second data field assigned to the selected first subitem field 536. According to examples, the second request may further request to return after execution of the data processing logic the data contents of the additional field of the subitem set, i.e. subitem data fields 2 and 3. The respective data content stored in the second data may be the result of applying the data processing logic to the data input received from the first data structure 415.

Furthermore, the first data structure comprises second metadata indicating the level of importance of the respective data fields. In case of the exemplary data structure shown in FIG. 5, each data field is assigned with second metadata like 512, 522, 532 according to the following table:

| Header data field | 1 | 2 | 3 | 4 | |
|---|---|---|---|---|---|
| Second metadata | 10 | 2 | 0 | 0 | |
| Item data field | 1 | 2 | 3 | 4 | 5 |
| Second metadata | 3 | 5 | 2 | 1 | 12 |
| Subitem data field | 1 | 2 | 3 | | |
| Second metadata | 1 | 0 | 8 | | |

For each data input received, the numerical value of the second metadata assigned to the data field receiving the data input is added to a sum of second metadata value. Thereby, second metadata are summed up until a pre-defined threshold, like e.g. 7, is exceeded. In response to exceeding the threshold, a first request requesting to store each of the received data inputs in the second data structure is sent to the backend server. Upon sending the first request, the sum of the second metadata is reset to zero and the summing of second metadata restarts with the next data input received. In case of a pre-defined threshold of 7, the first header data field, the fifth item data field and the fourth subitem data field are larger than the respective threshold. In other words, the level of importance of these data fields is high enough such that a request for storing the data input received by one of these data fields is sent upon receive of the data input without further delay by waiting for further data inputs. Other data fields like e.g. the third or fourth header data fields are assigned with a second metadata value of zero, i.e. these fields are of limited importance and do not contribute to triggering a sending of a request to the backend server. This may e.g. be due to the fact that data inputs received by these data fields are neglected by the data process logic of the backend server. In other words, they e.g. may not have any influence on other data values.

An analogous second data structure 425 may be assigned to the first data structure 415 and comprised by a backend server.

Figure 6:
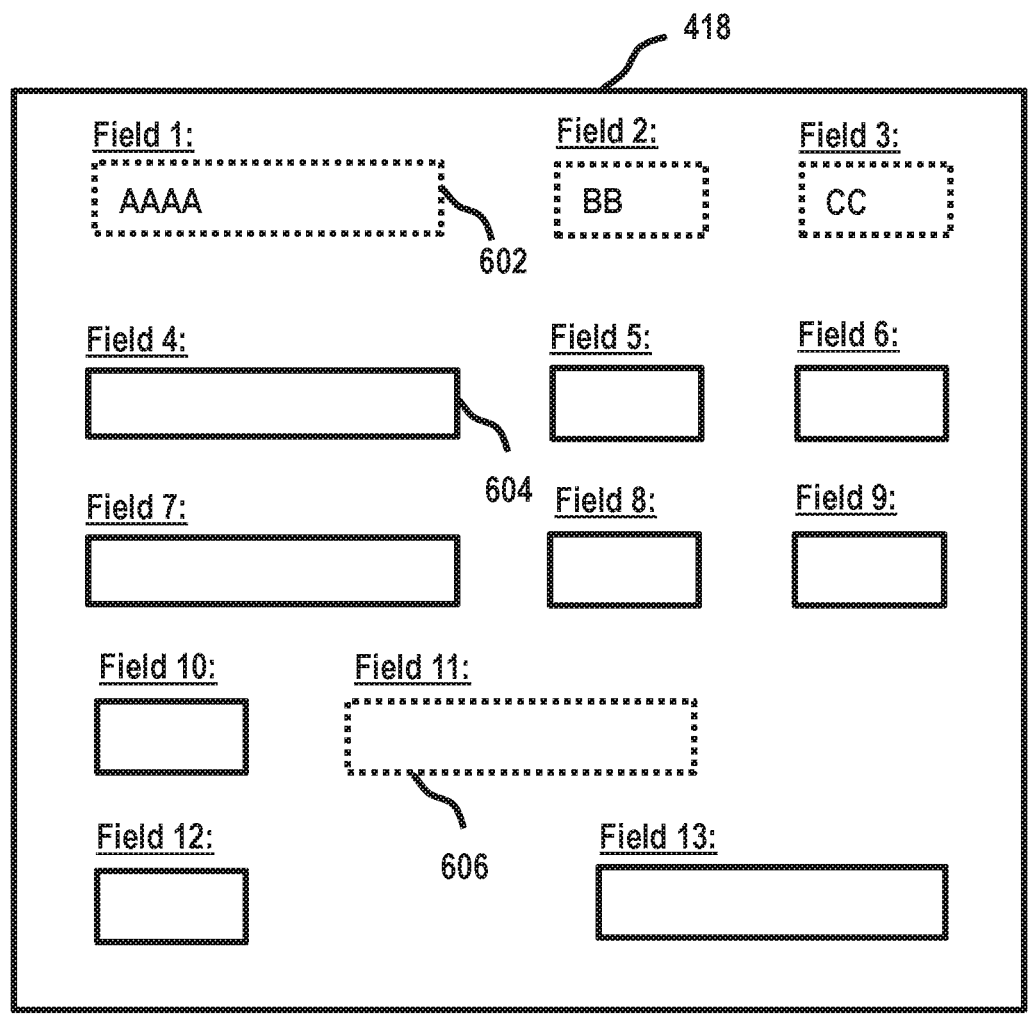
FIG. 6 depicts a schematic diagram illustrating an exemplary graphical user interface.

FIG. 6 shows a schematic diagram illustrating an exemplary graphical user interface 418. The graphical user interface 418 displays a plurality of data fields, i.e. fields 1 to 13, of a first data structure. For some of the data fields, like e.g. 602 and 606, only the data contents of the respective data fields are displayed, while the respective fields are not selectable for inputting data. Other data fields, like e.g. 604, may be selectable for inputting data. The fields 1 to 3 may for example display pre-defined data contents of three data fields of the data structure. The fields 4 to 10 as well as 12 and 13 may be selectable for inputting data which is stored in the respective fields of the data structure and transmitted to the backend server for being processed by a data processing logic of the backend server. Field 11 may for example be dependent on field 10. The data content of field 11 may be requested from the backend server upon transmitting a data input of field 10. The data content for field 11 received from the backend server as a result of applying the data processing logic may be stored in the respective data field 606 and displayed by the graphical user interface 418.

Figure 7:
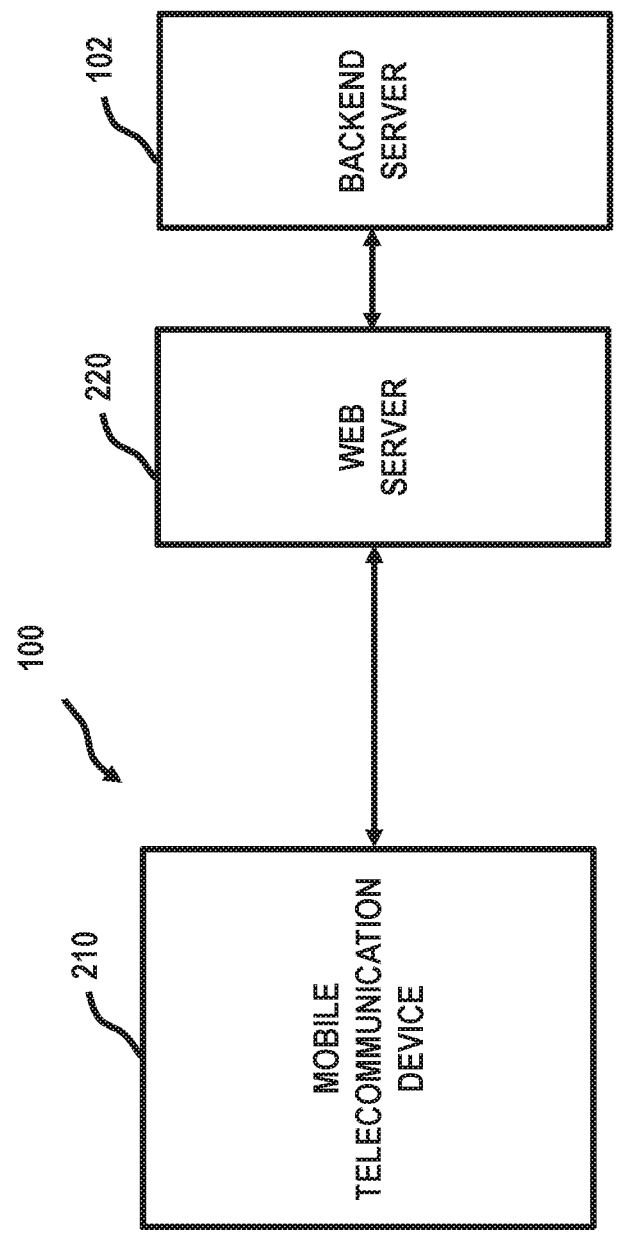
FIG. 7 depicts a fourth schematic diagram illustrating an exemplary telecommunication system.

FIG. 7 shows a fourth schematic diagram illustrating an exemplary telecommunication system 100. The system 100 comprises a mobile telecommunication device 210, an intermediate server in form of a webserver 220 and a backend server 102. The mobile telecommunication device 210 communicates with the backend server 102 via the webserver 220. The mobile telecommunication device 210 may be connected to the webserver 220 via a wireless digital telecommunication network, while the webserver 220 may be connected to the backend server 102 directly via a wired or wireless connection or via a further network. According to examples, the intermediate server 220 may operate in the networked environment of the system 100 between the backend server 102 and mobile telecommunication devices 210. The intermediate server 220 may be configured as a webserver controlling the communication between the mobile telecommunication device 210 and the backend server 102. According to examples, the intermediate server 220 may be implemented as an add-on module to the backend server 102 and operate on the same or a different hardware system. According to further examples, the webserver 220 may be deployed as a standalone program that executes on one or more computing devices or virtual machines distinct from the backend server 102. According to further examples, the webserver 220 is hosted by a third party, such as in a cloud-computing type arrangement.

The webserver 220 may receive a plurality of requests combined in a common request message from the mobile telecommunication device 210, extract the respective requests from the received message, and send the extracted requests to the backend server 102. In responds to sending the extracted requests to the backend server 102, the webserver 220 may receive a plurality of responses, combine the received responses into a common response message, and send the respective response message to the telecommunication device 210 via the wireless digital telecommunication network.

Figure 8:
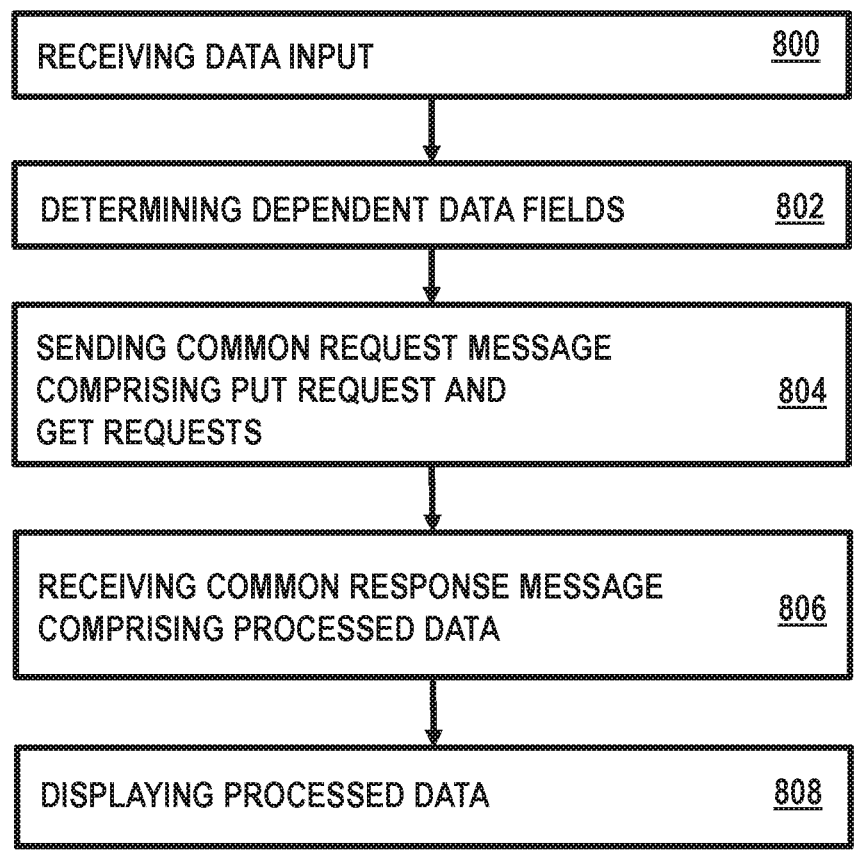
FIG. 8 depicts a first schematic flow diagram of a method of operating a telecommunication device.

FIG. 8 shows a first schematic flow diagram of a method of operating a telecommunication device 210. In block 800, a data input is received for a selected first data field selected via the graphical user interface. In block 802, one or more dependent first data fields of the first data fields are determined using the first metadata assigned to the selected first data field. In block 804, a common request message is generated by the mobile telecommunication device and sent to the backend server. The common request message may comprise a first request requesting to store the data input of the selected first data field in a selected second data field of the second data structure, wherein the respective selected second data field is assigned to the respective selected first data field. The common request message may further comprise one or more second requests requesting to return after execution of the data processing logic the data contents of one or more dependent second data fields of the second data structure, wherein the respective one or more dependent second data fields are assigned to the determined one or more dependent first data fields. The requests may for example be HTTP requests using 'PUT' and 'GET'. The common request message may be generated in form of a single $batch-request: 'POST www.backendserver.org/$batch'. The first and second requests may for example be comprised by the HTTP body:

begin-body
PUT www.backendserver.org/items('0001')
GET www.backendserver.org/items('0001')
GET www.backendserver.org/headers('4711')
end-body The first 'PUT' request comprised by the HTTP body may request to store the data input. The first 'GET' request may request to return after execution of the data processing logic the data resulting from processing the stored data input. The second 'GET' request may request to return after execution of the data processing logic the data contents of the one or more dependent second data fields. Alternatively, an 'expand' clause for combining the two 'GET' requests may be used, e.g. 'GET www.backendserver.org/headers('4711') ?$expand=items'.

The common request message may be received by a webserver, which extracts individual requests from the HTTP body and transmits them to the backend server. In response, the webserver receives the responses by the backend server to the individual requests and generates a common response message comprising the respective responses. In block 806, the common response message comprising the responses, i.e. the processed data, is received by the mobile telecommunication device. In block 808, the processed data, after extraction from the common response message and storing in the first data structure by the mobile telecommunication device, are displayed by the graphical user interface.

Figure 9:
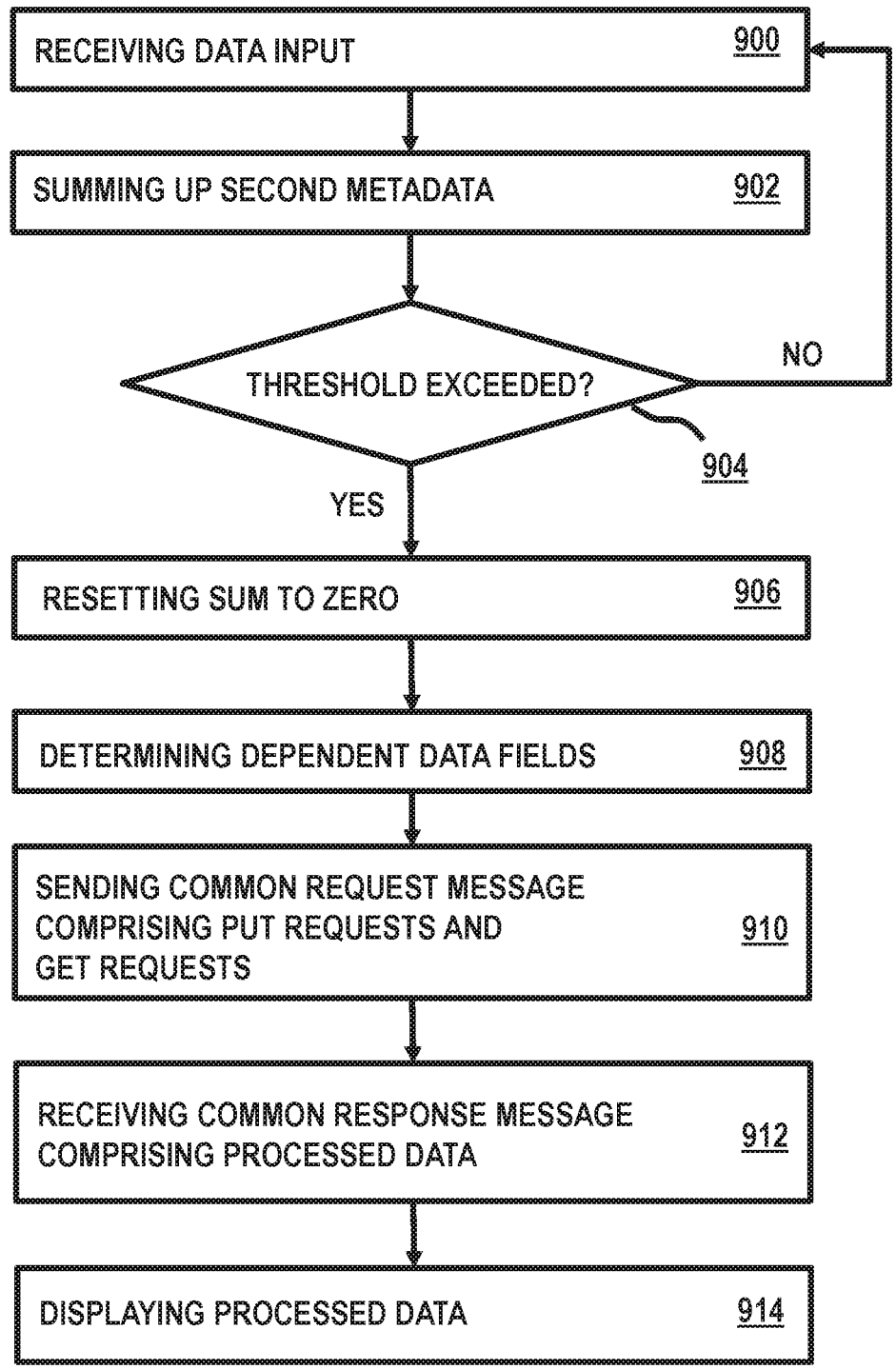
FIG. 9 depicts a second schematic flow diagram of a method of operating a telecommunication device.

FIG. 9 shows a second schematic flow diagram of a method of operating a telecommunication device 210. In block 900, a data input is received for a selected first data field selected via the graphical user interface. In block 902, the value of the second metadata assigned to the selected first data field is added to a sum of second metadata. In block 904, it is checked whether the sum of second metadata exceeds a pre-defined threshold value. In case the sum of second metadata does not exceed the pre-defined threshold value, the method continues with block 900, i.e. the next first data field is selected, a data input for the respective selected first field is received, the second metadata assigned to the respective selected first field is added to the sum of second metadata and it is checked whether the resulting second metadata exceeds the pre-defined threshold. In case the sum of second metadata exceeds the pre-defined threshold value, the method continues with block 906, wherein the sum of second metadata is reset to zero. In block 908, the dependent first data fields for each of the selected first data fields which have contributed to the sum of second metadata, i.e. which have received a data input, are determined. In block 910, a common request message is generated by the mobile telecommunication device and sent to the backend server. The common request message comprises a request, e.g. in form of a 'PUT' request, for each of the selected first data fields which have received a data input. Each of the respective requests requesting to store the data input of the respective selected first data field in a selected second data field of the second data structure, wherein the respective selected second data field is assigned to the respective selected first data field. The common request message may further comprise one or more second requests requesting to return after execution of the data processing logic the data contents of all the dependent second data fields of the second data structure which are assigned to one of the determined one or more dependent first data fields. In block 912, a common response message comprising the responses to the requests is received by the mobile telecommunication device. In block 914, the processed data, after extraction from the common response message and storing in the first data structure by the mobile telecommunication device, are displayed by the graphical user interface.

Figure 10:
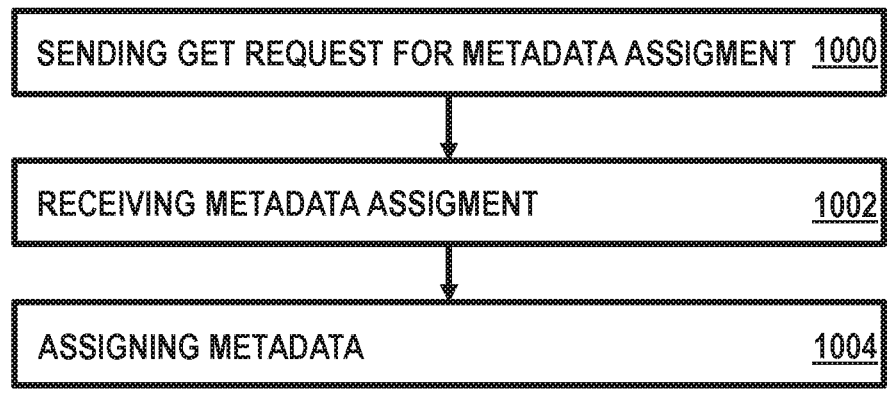
FIG. 10 depicts a third schematic flow diagram of a method of operating a telecommunication device.

FIG. 10 shows a third schematic flow diagram of a method of operating a telecommunication device 210. In block 1000, a request message is sent to the backend sever requesting a metadata assignment for the first data structure, e.g. an assignment of first metadata. This request may for example be sent in form of a HTTP 'GET' request. The metadata assignment may be automatically generated by the backend server analyzing the data processing logic. For example, for each second data field of the second data structure that is assigned to a first data field it may be analyzed to the processing of which additional second data fields the data content comprised by the respective second data field contributes. These additional second data fields may be determined to be dependent on the respective second data field. Consequently, the first data fields to which the additional second data fields are assigned may be determined to be dependent on the first data field to which the respective second data field, for which the analysis is performed, is assigned. In block 1002, the requested metadata assignment is received by the mobile telecommunication device. In block 1004, metadata is assigned to the first data structure according to the received metadata assignment. A metadata assignment of the second metadata may be requested from the backend server analogously.

LIST OF REFERENCE SIGNS 100 telecommunication system
102 backend server
108 digital telecommunication network
110 laptop
112 smartphone
114 tablet
116 PDA
120 application enabled device
202 request
204 response
210 mobile telecommunication device
220 webserver
302 processing unit
304 memory
306 program instructions
308 volatile memory
310 non-volatile memory
312 removable storage
314 non-removable storage
316 telecommunication interface
318 input device
320 output device
322 battery
411 transceiver
412 processor
413 memory
414 application
415 first data structure
417 display
418 GUI
419 bus
421 transceiver
422 processor
423 memory
424 application
425 second data structure
510 header set
512 first metadata
514 second metadata
516 data field
518 data field
520 item set
522 first metadata
524 second metadata
526 data field
528 data field
530 subitem set
532 first metadata
536 data field
602 data field (display)
604 data field (input)
606 data field (display)

The invention claimed is:

1. A telecommunication method for operating a mobile telecommunication device being coupleable to a wireless digital telecommunication network, the mobile telecommunication device comprising a first processor, a display device, an input device, and a first memory, the first memory comprising a first application and a first data structure, the first data structure comprising first data fields, the first application comprising first instructions that, when executed on the first processor, cause the display device to display a graphical user interface configured for displaying selectable first data fields, for displaying data input inputted into the selected data fields and for displaying data content stored in first data fields, each first data field being assigned to a second data field of a second data structure comprised by a backend server, the mobile telecommunication device being connectable to the respective backend server via the wireless digital telecommunication network, the mobile telecommunication device and the backend server communicating with each other using a unidirectional request-response-protocol, the backend server comprising a second processor and a second memory, the second memory comprising a second application and the respective second data structure, the second application comprising second instructions that, when executed on the second processor, cause the backend server to execute a data processing logic on the second data structure upon receiving data input from the mobile telecommunication device, the data processing logic establishing a correlation between the data contents of two or more of the second data fields, the method comprising by the mobile telecommunication device:
receiving from the input device a data input for a first data field selected via the graphical user interface, the selected first data field being assigned with first metadata indicating a dependency between the selected first data field and one or more dependent first data fields of the first data fields, the respective dependency of the dependent first data fields resulting from the correlation established by the data processing logic of the backend server between the data content of a selected second data field of the second data fields which is assigned to the selected first data field and the data content of one or more dependent second data fields of the second data fields, wherein each dependent second data field is assigned to one of the one or more dependent first data fields, in response to receiving the data input, storing and displaying the received data input of the selected first data field, sending to the backend server a first request requesting to store the received data input in the respective selected second data field, determining the one or more dependent first data fields indicated by the first metadata, sending to the backend server a second request requesting to return after execution of the data processing logic the data contents of the one or more dependent second data fields assigned to the determined one or more dependent first data fields, in response to sending the second request, receiving the requested data contents, in response to receiving the requested data contents, storing and displaying the received data contents.

2. The telecommunication method of claim 1, wherein the first data structure comprises a plurality of sets of first data fields, each of the respective sets comprises one or more of the first data fields, the selected first data field being comprised by a first one of the respective sets, the one or more dependent first data fields being comprised by one or more dependent second ones of the respective sets, the second request sent by the mobile telecommunication device further requesting in addition to the data content of the selected first data field to return after execution of the data processing logic the data contents of the second data fields assigned to the additional first data fields comprised by the respective first set.

3. The telecommunication method of claim 2, wherein the first metadata indicates the dependency between the selected first data field and the one or more dependent first data fields by indicating a dependency between the respective selected first data field and one or more dependent second sets comprising the respective dependent first data fields, the second request sent by the mobile telecommunication device further requesting to return the data contents of the one or more dependent second data fields by requesting to return after execution of the data processing logic the data contents of each second data field assigned to one of the first data fields of the one or more dependent second sets of first data fields.

4. The telecommunication method of claim 1, wherein the second request sent by the mobile telecommunication device further requests to return after execution of the data processing logic the data content stored in the selected second data field.

5. The telecommunication method of claim 1, the method further comprises:

receiving from the input device a set of data inputs for a selected set of first data fields selected via the graphical user interface, each of the selected first data fields being assigned with first metadata indicating a dependency between the respective selected first data field and one or more dependent first data fields, the respective dependency resulting from the correlation established by the data processing logic of the backend server between the data content of a selected second data field of the second data fields which is assigned to the respective selected first data field and the data content of one or more dependent second data fields of the second data fields, wherein each of the respective dependent second data field is assigned to one of the one or more of the respective dependent first data fields, in response to receiving each data input, storing and displaying the received data input of the respective selected first data field, the first request sent by the mobile telecommunication device further requesting to store each of the received data inputs in a selected second data field of the second data fields which is assigned to the selected first data field of the respective data input, determining for each of the selected first data fields the one or more dependent first data fields indicated by the first metadata of the respective selected first data field, the second request sent by the mobile telecommunication device further requesting to return after execution of the data processing logic the data contents of each of the dependent second data fields assigned to one of the determined one or more dependent first data fields, in response to sending the second request, receiving the requested data contents, in response to receiving the requested data contents, storing and displaying the received data contents.

6. The telecommunication method of claim 1, wherein the sending of the first and second request further comprises combining the first and the second request into one common request message and sending the respective common request message to the backend server.

7. The telecommunication method of claim 6, wherein the receiving of the requested data contents further comprises receiving a common response message comprising a storing confirmation in reply to the first request and the requested data contents in reply to the second request.

8. The telecommunication method of claim 1, wherein the first data structure is hierarchically structured and the method further comprises in order to assign the one or more of the first data fields with the first metadata:

performing an automatic analysis on the hierarchical structure of the first data structure by the mobile telecommunication device resulting in the first metadata for the one or more first data fields, assigning the resulting first metadata to the one or more first data fields.

9. The telecommunication method of claim 1, the method further comprises in order to assign the one or more of the first data fields with the first metadata:

sending to the backend server a third request requesting first metadata to be assigned to one or more of the first data fields, in response to sending the third request, receiving the first metadata for the one or more first data fields, the received first metadata resulting from an automatic analysis by the backend server on the correlation established by the processing logic between the data contents of two or more of the second data fields, in response to receiving the first metadata, assigning the one or more first data fields with the received first metadata.

10. The telecommunication method of claim 1, wherein one or more of the first data fields are assigned with second metadata indicating a level of importance of the respective first data field, the method further comprises:

sending the first request in response to determining that the levels of importance of the one or more selected first data fields satisfy a pre-defined criterion.

11. The telecommunication method of claim 10, wherein the second metadata comprise numerical values, the method further comprises:

summing up the second metadata of the one or more selected first data fields, the pre-defined criterion being satisfied by the sum of second metadata exceeding a pre-defined threshold, upon sending the first request, resetting the sum of the second metadata to zero.

12. The telecommunication method of claim 11, wherein the second metadata assigned to at least one first data field is larger than the pre-defined threshold.

13. The telecommunication method of claim 11, wherein second metadata is assigned to each of the first data fields.

14. The telecommunication method of claim 10, in order to assign the one or more of the first data fields with the second metadata, the method further comprises:
performing an automatic analysis on the hierarchical structure of the first data structure by the mobile telecommunication device resulting in the second metadata for the one or more first data fields,
assigning the resulting second metadata to the one or more first data fields.

15. The telecommunication method of claim 10, in order to assign the one or more of the first data fields with the second metadata, the method further comprises:
sending to the backend server a fourth request requesting second metadata to be assigned to one or more of the first data fields,
in response to sending the fourth request, receiving the second metadata for the one or more first data fields, the received second metadata resulting from an automatic analysis by the backend server on the correlation established by the processing logic between the data contents of two or more of the second data fields,
in response to receiving the second metadata, assigning the one or more first data fields with the received second metadata.

16. A mobile telecommunication device, comprising:
a memory storing computer-readable instructions; and
at least one processor configured to execute the compute-readable instructions to perform the telecommunication method of claim 1.

17. A telecommunication system comprising a mobile telecommunication device and a backend server, wherein the mobile telecommunication device and the backend server are configured for performing the telecommunication method of claim 1.

18. The telecommunication system of claim 17, wherein the telecommunication system further comprises an intermediate server, the intermediate server being connected to the mobile telecommunication device via the wireless digital telecommunication network, the backend server being connected to the wireless digital telecommunication network and the mobile telecommunication device via the intermediate server,
the intermediate server comprising a third processor and a third memory with a third application, the third application comprising third instructions that, when executed on the third processor, cause the intermediate server to:
receive a plurality of requests combined in a common request message, extract the respective requests and transfer the extracted requests to the backend server,
in response to transferring the extracted requests to the backend server, receive a plurality of responses, combine the received responses into a common response message, and send the respective response message to the mobile telecommunication device via the wireless digital telecommunication network.

19. A non-transitory computer readable storage medium having machine executable instructions embodied therewith, the machine executable instructions being executable by a processor of a telecommunication device, execution of the machine readable instructions on the processor causing the processor to control the telecommunication device to perform the telecommunication method of claim 1.

* * * * *